June 29, 1965 — W. A. BREWER — 3,191,371
AIRFOILS FOR ROTARY LAWN MOWER
Filed Dec. 26, 1963

INVENTOR.
WILLIAM A. BREWER
BY
ATTORNEYS.

United States Patent Office 3,191,371
Patented June 29, 1965

3,191,371
AIRFOILS FOR ROTARY LAWN MOWER
William A. Brewer, Huntington, W. Va.
Filed Dec. 26, 1963, Ser. No. 333,589
9 Claims. (Cl. 56—295)

This invention relates to an improved rotary lawn mower or like structure and more particularly to the use of airfoils in forming an improved blade structure.

In the past few years, power driven rotary lawn mowers utilizing a high speed vertical shaft coupled to a horizontally oriented flat cutting blade have almost completely replaced the more conventional drum-type lawn mowers in which a plurality of blades moving about a horizontal axis cooperate with a fixed blade at the periphery of the rotating blade adjacent to the lawn surface to affect a desired cutting action for the individual blades of grass. In this regard, the flat high speed, horizontally oriented rotary blade of the rotary lawn mower has no backing surface for supporting the grass blades during the cutting stroke. Manufacturers of rotary lawn mowers have modified the horizontally moving blade by providing upwardly inclined portions commonly called "vanes" at the outer edges to cause some lifting action on the blades of grass as the mower moves over them in an attempt to get the grass blades upright and thus achieve proper cutting impact between the high speed rotating blade and the blades of grass. These vanes, in addition to the normal effect of the flat blade rotating about the vertical axis within a somewhat confined area such as that produced by the conventional housing produce a cyclonic action by deflection of air. The currents of air in the cyclone tend to hold the grass upright, and also tend to carry in them leaves and grass clippings. As a result of high speed rotation, there is a tendency to give a centrifugal motion to the whirling mass of grass and leaves. Conventional rotary lawn mowers provide a radially extending discharge duct on one side of the blade housing through which at least a portion of the cuttings as well as any debris deflected upwardly by the rotating blade have a tendency to be discharged to one side of the path of the moving lawn mower.

The creation of the cyclone action by the application of upwardly extending vanes to the outer or peripheral edges of the blade tends to cause a lateral discharge of cuttings, etc., from the moving lawn mower, but there is no assurance that all of the cuttings and/or all of the debris material such as leaves within the path of the moving mower will be raised, cut or mulched and discharged effectively, and particularly, there is nothing in the prior art that will cause the discharge of debris only through the discharge port at the one side of the machine.

It is therefore a primary object of this invention to provide an improved high speed blade structure for a conventional rotary lawn mower in which a maximum force is achieved which will effectively lift all of the grass cuttings, leaves, debris and other material in the path of the mower and discharge all of it through the conventional discharge port of a standard rotary lawn mower in a highly mulched form for deposition to one side of the moving mower or for deposition in an attached container.

Mowers employing the vanes of the prior art have little mulching effect and although they can collect leaves and discharge them into a container the uncut, or unmulched, leaves so rapidly fill the container with a great volume of leaves having little mass, that the employment of these mowers to clean a lawn of leaves is impractical.

It is thus a second primary object of this invention to provide an improved blade structure that will effectively mulch the leaves it lifts from the lawn, so that their volume after mulching is so small that the container into which they are discharged is slowly filled with mulched leaves having little volume and great mass.

It is a further object of this invention to provide an improved blade construction which will provide maximum lifting force to the individual blades of grass and insure proper positioning for the rotating blade cutting elements, which will not interfere with the cutting action of the blade and which will achieve a finer chopping and mulching of the blade cuttings, leaves, etc., within the path of the mower than any rotary lawn mower having a blade of conventional configuration.

It is a further object of this invention to provide an improved blade structure for a conventional rotary lawn mower in which the lawn mower may be readily adapted for other purposes such as high speed vacuum cleaning of non-lawn surfaces such as driveways, walks, docks, streets, warehouse floors, aircraft runways, etc.

It is a further object of this invention to provide an improved blade structure for a conventional rotary lawn mower in which the lifting element of the blade structure may be attached to a conventional relatively flat blade or in which the lifting element and the cutting element may be incorporated in an integral construction.

It is a further object of this invention to provide an improved blade structure for a conventional rotary lawn mower in which the lifting force created by the improved blade structure may be varied at the will of the operator.

Further objects of this invention will be pointed out in the following description and claims and illustrated in the accompanying drawing which discloses, by way of example, the principle of this invention and the best mode which has been contemplated of applying that principle.

Figures 1, 2, 3, 4, 5, 6, 7:
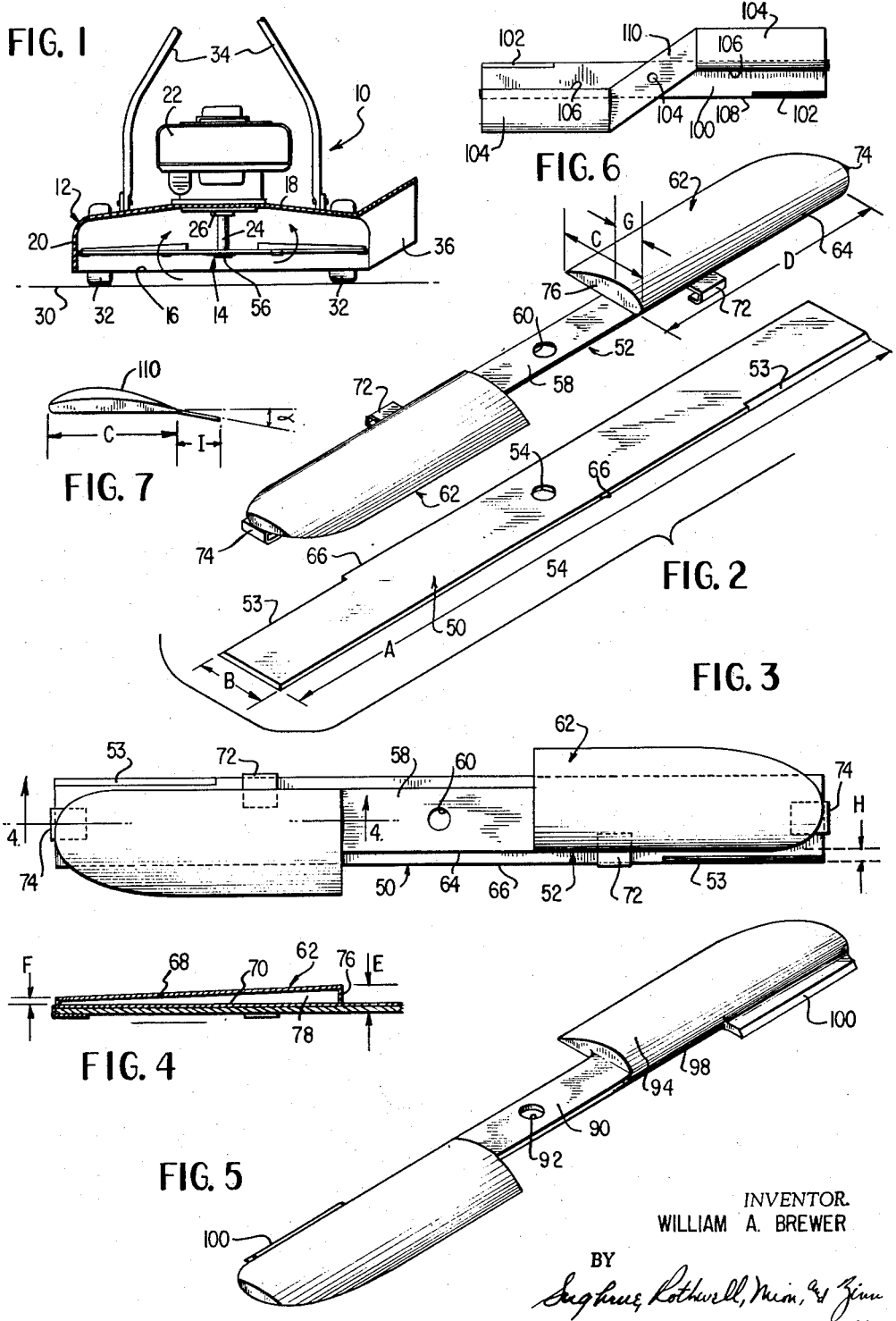
FIGURE 1 is a rear elevational view of a conventional rotary blade lawn mower incorporating the improved blade structure of the present invention.
FIGURE 2 is an exploded, perspective view of one embodiment of the present invention in the form of an attachment for a conventional flat blade.
FIGURE 3 is a top plan view of the element shown in FIGURE 2 with the airfoil element of the present invention attached to the conventional flat cutting blade.
FIGURE 4 is a cross-sectional, elevational view of a portion of the assembly shown in FIGURE 3, taken about lines 4—4.
FIGURE 5 is a perspective view of another embodiment of the present invention.
FIGURE 6 is a top plan view of a third embodiment of the present invention.
FIGURE 7 is a cross sectional side elevation of yet another embodiment of the present invention.

In general, the apparatus of this invention comprises a blade structure in the form of an airfoil which is coupled to a shaft for rotation about a vertical axis within a conventional rotary blade lawn mower housing whereby the airfoil provides the highest possible lift for the individual blades of grass during mowing as well as any debris, leaves etc., which are in the path of the mower. In one form the airfoil is formed on the blade along the majority of its length, is spaced rearwardly from the cutting edges of the blade and is formed integrally therewith. In another embodiment, the airfoil of the blade assembly is formed as a separate element and is attached to a conventional flat, rotary cutting blade. The blade assembly, either integrally formed or in the form of an attachment may have the airfoil section spaced a relatively large distance from the lead cutting edge of the rotating blade assembly and fixed or adjustable flaps may be added to the trailing edge of the airfoil element to effect maximum lift properties to the rotating blade structure.

Referring to the drawing, there is shown in FIGURE 1, a conventional rotary blade lawn mower 10 consisting of a housing 12 which acts to form an enclosure about a rotating blade assembly indicated at 14, with the exception of the open bottom 16, the enclosure being formed by a top wall 18 and an annular side wall indicated at 20. The top wall 18 acts to support or is used in conjunction with additional support members to support a conventional motor or shaft drive means 22 which may take the form of either a small gasoline engine or an electric motor as is conventional in the art. The power means or motor 22 includes a central drive shaft 24 which extends through bushing member 26 and protrudes within the cavity 28 formed by the enclosure or housing 12 and the lower supporting surface which in most cases is a lawn 30. The motor is supported for movement about the surface of the lawn 30 by opposed wheels 32, and the mower may be provided with a pair of front and rear wheels of equal or different sizes which may be adjustable with respect to the housing for changing the height or clearance between the rotating blade assembly 14 and the surface of the ground or lawn 30. The handle (not shown) is attached to the mower housing through a pair of upstanding tubular support members 34. All of the elements with the exception of the rotary blade assembly 14 are conventional and the improved blade structure of the present invention is applicable to any conventional rotary blade lawn mower. It is to be noted that the motor 22 is adapted to rotate the shaft 24 in a clockwise direction as viewed from above, tending to discharge any mulched grass cuttings, leaves, debris, etc., through a discharge port 36 formed on the right side of the housing wall 20.

The present invention is directed to an improved rotary cutting blade for a conventional lawn mower of this type or like apparatus and the inventive concept resides in the utilization of an integral or attached airfoil element for an otherwise conventional flat blade cutting structure to effect the creation of maximum pressure differential between the upper and lower surfaces of the roating blade assembly, thereby creating sufficient lift to insure that the individual blades of grass are standing upright during the cutting action, while at the same time lifting leaves, debris, etc., in the path of the moving mower into position to be cut or mulched by the high speed rotating blade assembly and ultimately discharged through the discharge port 36. The integral or attached airfoil element is characterized by having the configuration of an airplane wing which is self-evident from viewing the figures within the single sheet of drawing. Thus, in using the term "airfoil" throughout the specification and claims, it is intended that the airfoil be one having this type of configuration. FIGURES 2, 3, and 4 show one embodiment of the present invention as applied to a conventional flat rotary cutting blade. The cutting blade assembly of FIGURE 2 consists primarily of two elements, a conventional flat cutting blade 50 and an attachment in the form of an airfoil structure 52. The flat cutting blade 50 is generally rectangular in configuration, being relatively thin and having a pair of spaced cutting edges 53 on diagonally opposed leading edges, the cutting edges being slanted or tapered so as to produce a very fine cutting edge adjacent the bottom surface. Centrally of the blade there is provided an aperture 54 allowing the blade to be coupled to the rotating shaft 24 through the conventional use of a threaded nut 56 which is adapted to be threaded on the end of shaft 24 after the blade is positioned on the shaft at right angles thereto. The method of mounting the blade element 50 onto the rotating shaft 24 forms no portion of the present invention, and the present invention is applicable to most conventional flat blade cutting structures. The airfoil element in the form of attachment 52 comprises in this embodiment a central relatively thin mounting strip 58 which in like manner to blade element 50 includes a central aperture 60 of somewhat larger diameter than the terminal portion of shaft 24 to allow it to be positioned above the blade element 50 for rotation therewith about the shaft axis as the shaft 24 rotates. The airfoil assembly element 52 includes airfoil portions indicated generally at 62 at either end of the attachment assembly. It is to be noted that the airfoil sections do not extend completely from a position adjacent the center hole 60 to the extreme tip of the rotating blade 50 but only in the area of greatest effectiveness, that is, near the periphery at the point where the highest angular velocity is achieved. While all of the parameters of the airfoil element 52 may be varied depending upon the size of the cutting blade 50, the angular velocity of the drive shaft 24 and various other factors, particular dimensions of one airfoil assembly utilized with a 24 inch cutting blade driven at maximum velocity of 3400 to 3600 r.p.m. in a conventional rotary blade lawn mower consisted of an airfoil attachment identical in configuration to element 52 of the assembly shown in FIGURE 2 in which each of the airfoil sections 62 had a length indicated at D in FIGURE 2 of 9 inches from root to tip, having a mean distance of 3 inches from trailing edge to leading edge as indicated at C and a dimension G of 1 inch being the distance from the leading edge to the point of maximum thickness which, in this case, is the distance E indicated as being ¾ of an inch at the root (FIGURE 4), and a distance indicated by arrows F of ⅜ of an inch at the tip of the airfoil section. The point of maximum thickness was found most satisfactory at a point indicated by dimension G which is in this case 1 inch from the leading edge and, in general, a distance approximating one third from the leading edge to the trailing edge. The airfoil section 62 is provided with elliptical tips having relatively smooth transition with the relatively flat leading and trailing edges similar to conventional airfoil structures for aircraft. As indicated best in FIGURE 3, instead of the leading edge of the airfoil element 52 being flush with the leading edge of the blade element 50, the leading edge of the airfoil element 52 is positioned rearwardly of the leading edge 66 of the rotary cutting blade element by a distance indicated at H. This distance H may be zero or approximately zero without materially affecting the resultant lift of the rotating blade assembly but the placement of the leading edge 64 of the airfoil element near the leading edge 66 of the blade element will have some effect upon the cutting action of the blade assembly as it rotates at high speed over a grassy lawn. As indicated in FIGURE 4, the airfoil section 62 is constructed of suitable sheet metal which is formed of stainless steel or other steel resistant to abrasion including an upper skin 68 spaced from a lower skin 70, thus forming a hollow airfoil element. The sections or surfaces of skin sections 68 and 70 may be welded or otherwise joined to form a lightweight attachment in the form shown in FIGURE 2. Clip members 72 are provided on the leading edge of the airfoil elements 62 for attachment to the leading edges 66 of the flat cutting blade 50. In like manner a pair of clips are provided at the tips of the airfoil segments or sections 62 and are frictionally clamped to the outer edges of the blade element 50. It is desirable to close the space between the upper and lower skins 68 and 70 of the airfoil element and end walls 76 may be welded or soldered to form an entirely enclosed hollow chamber 78 within the individual airfoil sections 62. Of course, the complete airfoil section 62 forming a part of the airfoil element 52 may be formed from a solid piece of metal stock resistant to the abrasive effects of the leaves and grass cuttings. In the embodiment shown in FIGURES 2, 3, and 4, the dimension H is approximately one-half of one inch in the above example to prevent interference by the airfoil element with the cutting action of the rotating cutting blade 53 as the assembly rotates at high speed with shaft 24.

While the airfoils may be of the detachable type as in the embodiment of FIGURE 2, an airfoil section may be stamped into the stock metal of an ordinary flat mower blade or may be cast integrally as shown in the embodiment of FIGURE 5. Reference to FIGURE 5 shows an integral rotary cutting blade in an airfoil element which includes a generally flat center section 90 of narrow width and thickness and having a central aperture 92 allowing attachment to the rotary shaft 24 in the same manner as in the previous embodiment. The outer ends of the integral structure are in the form of an airfoil as indicated by the sections 94 and include an extended forwardly protruding cutting edge 100 adjacent to the outer periphery, with the configuration of the airfoil section being similar to the configuration of the airfoil section 62 shown in the embodiment of FIGURE 2 with the exception that due to the fact that the improved blade structure is unitary, there is no need for the clamping members 72 and 74 as shown in the previous embodiment. The cutting edge of the blade may be extended to run the full length of the airfoil in order to cut and mulch those leaves and grass clippings which rise toward the inboard sections of the airfoil. In like manner to the embodiment of FIGURES 2, 3, and 4, the leading edge 98 of the airfoil section 94 is spaced somewhat behind the cutting edge 100. Thus, the airfoil does not affect appreciably the cutting action of the edge 100, while at the same time the abrasion of the cuttings on the airfoil section 94 is greatly decreased due to its remoteness from the lead cutting edge 100.

A further embodiment is shown in FIGURE 6 which is illustrated in the form of an airfoil attachment for a conventional cutting blade such as that used in the FIGURE 2 assembly. In this case the blade 100 is provided with cutting edges 102 and a central aperture 104, and in all other respects is identical to the blade element 50 forming a portion of the assembly of FIGURE 2. The principal difference lies in the over-all configuration of the airfoil element and principally in the positioning of the airfoil sections 104. The airfoil sections 104 have leading edges 106 which lie parallel to and are spaced rearwardly of leading edges 108 of the blade element 100. The central joining section 110 of the airfoil element is formed from a flat strip of metal but unlike the arrangement of FIGURES 2 and 3, the intermediate or joining section 110 of the airfoil sections 104 in like manner to the previous embodiments is formed from thin sheet metal but instead of being coaxial to the airfoil sections, the axis of the intermediate or joining section 110 is oblique and therefore acts to space or position the airfoil sections 104 much to the rear of the leading edge 108 of the lower cutting blade 100. In this case, the leading edge 108 of the blade is 24 inches in length as identified at dimension A in FIGURE 2 and the leading edge 106 of the airfoil is approximately 1½ inches from the leading edge 108 of the blade. This results in better lift, less wear on the airfoil and allows the grass cutting properties of the lower blade element full play. The increase in lift apparently occurs by freeing the air just in front of the airfoil sections 104 of grass clippings and leaves.

Referring to FIGURE 7, the lift of any one of the three embodiments shown in FIGURES 2, 5, or 6 may be increased by the addition of flaps to the airfoil much in the same manner as flaps are added to the airfoils of conventional aircraft. It has been found that flaps of 30% of chord are most advantageous and increase the lift by perhaps 20% when the angle of the flap is approximately 10° to the plane of the chord. It is also interesting to note that a greater downward angle of the flaps creates a cyclone effect which is the type of effect normally found in rotary blade lawn mowers and acts actually to destroy the lift created by the Bernoulli effect. In the structure shown in FIGURE 7, which is a side elevational view in cross section of an airfoil, the airfoil section 110 has a chord dimension indicated at C which may be, for example, 3 inches in length, while the width dimension of the flap is approximately one third, and as indicated by dimension I it would be in the order of 1 inch in this case. The angle alpha is shown to be approximately 10° and in this case increases the lift by approximately 20%.

The lift provided by the airfoil in the form of an attachment or formed integrally with the rotating blade for an otherwise conventional rotary blade mower is achieved through the utilization of the Bernoulli effect. The total pressure head in pounds per square foot achieved may be identified by the following equation:

$H = p + 1/2\rho V^2$
$H$ = total pressure head in pounds per square foot
$p$ = static pressure in pounds per square foot
$\rho$ = is the density in slugs per cubic foot
$V$ is the velocity in feet per second The rotation of the airfoil creates a suction on both the top and bottom of the airfoil and the suction or pressure differential effect is well known and is the basis of the use of airfoils in aviation.

It is apparent from the foregoing that the lift created by the utilization of the Bernoulli effect through the application of an airfoil to the rotating blade or in the form of an attachment creates a desired lift to carry leaves, grass clippings and other debris up into the area of the rotating airfoil and blade and tends to suspend them there for a period of time subjected to successive blows from the blade and airfoil. This chops and mulches the leaves and grass clippings effectively. The air stream and its burden of mulched leaves and grass clippings are discharged through the usual discharge port 36 on the right side of the mower. The discharge may be as a result of some centrifugal action to the masses as they are suspended and moved in response to the rotating blade; but, as a result of the great pressure differential caused by the airfoil blade, it is probable that the natural tendency of the high pressure created in reaction to the low pressure is to relieve at the first available point which is at the discharge orifice or port 36. The discharge to the right may further be caused by the fact that the airfoil blade is retreating on the right side at a lower angle of attack than the angle of attack while advancing on the left side, the rotation being clockwise, which creates an imbalance of pressures between the left and right sides. It may be desirable to provide the desired angle of attack or to increase the natural angle of attack by inclining the axis of the rotating shaft 24 by setting the front wheels higher than the back wheels in order to increase the angle of attack as the blade is moved forward on the left side in its clockwise rotation. The angle of attack of the airfoil may also be increased by permanently bending the cutting blade element 50 at the root of the airfoil element 62 to the optimum angle of attack, or in the case of the integral rotary cutting blade and airfoil element permanently stamping or casting into it the optimum angle of attack.

The discharged mulched leaves and grass clippings and debris may be collected in a porous bag attached to the discharged port in a conventional manner or may be discharged into the air to fall upon and remain on the ground in a highly mulched state. In either case the leaves are disposed of. In addition to discharging grass clippings as a result of the normal use of the mower to keep the lawn mowed, the utilization of the improved blade having an airfoil will operate quite satisfactorily to pick up old grass clippings that have been lying on the ground at the grass roots for many weeks as well as picking up leaves which have fallen on the ground and have accumulated to great depths. It is to be noted that the present invention improved blade structure may be used quite advantageously on golf greens and other grassy areas where a particularly clean effect is desired.

While there have been shown and described and pointed out the fundamental novel features of the invention as applied to preferred embodiments, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. An improved cutting blade having portions in the form of airfoils of airplane wing configuration for a rotary lawn mower or the like having a generally vertical, high speed rotating shaft with the blade adapted to rotate horizontally adjacent the surface of a lawn, said blade comprising: a main portion in the form of a thin rectangular strip including longitudinally extending cutting surfaces disposed along respective blade leading edges, airfoils disposed on opposite sides of the blade axis of rotation, adjacent the blade cutting surfaces, and above the plane formed thereby, said airfoils including leading edges extending longitudinally, parallel to, but disposed rearwardly of the leading edges of said cutting surfaces, said airfoils further including a convex upper surface and a span dimension at least as large as the airfoil chord dimension whereby the presence of the airfoils provides greatly increased lift in the area of the rotating blade.

2. The cutting blade as claimed in claim 1 wherein said airfoils having a point of maximum airfoil thickness in the order of one third the chord dimension spaced rearwardly of the airfoil leading edge, thereby forming an airfoil characterized by a relatively steep leading edge as compared to the trailing edge.

3. The cutting blade as claimed in claim 1 wherein each airfoil extends respectively from the periphery of the rotating blade inwardly toward the axis of rotation approximately a distance in the order of one-third of the over-all blade length.

4. The cutting blade as claimed in claim 1 further including friction clip means, and means for fixing said friction clip means to said airfoil for frictional engagement with the edges of said rectangular strip portion of the cutting blade for locating said airfoils with respect to said rotating cutting blade and for maintaining said airfoils in engagement therewith during high speed rotation.

5. The cutting blade as claimed in claim 1 wherein said airfoil trailing edge terminates in a flap with said flap being at a greater angle of attack than the remainder of the airfoil.

6. The cutting blade as claimed in claim 5 wherein said angle is from 0° to 15° and said flap is of a width in the order of one-third of said airfoil chord dimension.

7. The cutting blade as claimed in claim 1 wherein said airfoils are positioned with their leading edge slightly overlapping the respective trailing edge of said main rectangular blade portion to effect maximum lift and minimum interference with the cutting action of the rotating blade assembly.

8. An improved rotor blade construction having portions in the form of airfoils of airplane wing configuration for a rotary blade lawn mower or the like having a housing forming an enclosure positioned above an operating surface and including a lateral discharge port above the plane of the rotating blade and means for vertically supporting a high speed rotating shaft within said enclosure, the improvement comprising: a single element rotary blade having spaced, integrally formed airfoils positioned near the radial extremities of the rotating blade, said single element rotary blade being generally rectangular and having a pair of longitudinally extending cutting surfaces directed radially away from the axis of rotation along opposite edges of said blade, said airfoils being disposed on opposite sides of said axis of rotation with the longitudinally extending leading edges of said airfoil parallel to but disposed rearwardly of the leading edge of said cutting surfaces, said airfoils having convex upper surfaces and a span dimension at least as large as the airfoil chord dimension whereby said airfoils within said enclosure act during blade rotation to produce maximum lift tending to maintain grass clippings, leaves, debris, etc., in the path of said rotating blade to effect the subsequent discharge of this material in a highly mulched form.

9. The device as claimed in claim 8 wherein the point of maximum airfoil thickness is in the order of one-third the chord dimensions, spaced rearwardly of the airfoil leading edge.

References Cited by the Examiner
UNITED STATES PATENTS

| | | | |
|---|---|---|---|
| 2,799,985 | 7/57 | Rosenberg | 56—295 |
| 3,032,957 | 5/62 | Boyer | 56—25.4 |
| 3,049,855 | 8/62 | McMillan | 56—295 |
| 3,080,697 | 3/63 | Mauro | 56—295 |
| 3,093,952 | 6/63 | Bonser | 56—295 |
| 3,097,468 | 7/63 | Johnson | 56—295 |
| 3,140,575 | 7/64 | Ott et al. | 56—295 |

References Cited by the Applicant
UNITED STATES PATENTS

| | | |
|---|---|---|
| 2,663,948 | 12/53 | Clark. |
| 2,697,322 | 12/54 | Watrous. |
| 2,720,070 | 6/56 | Arrington. |
| 2,720,071 | 10/55 | Watanabe. |
| 2,764,865 | 12/53 | Pollard. |
| 2,836,029 | 5/58 | Johnson. |
| 2,910,818 | 11/59 | Beal. |
| 2,942,396 | 6/60 | Farnam. |
| 2,990,666 | 7/61 | Blume. |
| 3,006,128 | 10/61 | Weiland. |

T. GRAHAM CRAVER, *Primary Examiner.*

RUSSELL R. KINSEY, *Examiner.*